(12) United States Patent
Rowe

(10) Patent No.: US 6,260,794 B1
(45) Date of Patent: Jul. 17, 2001

(54) DOLPHIN CASCADE VANE

(75) Inventor: Robert K. Rowe, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/305,648

(22) Filed: May 5, 1999

(51) Int. Cl.$^7$ .................................................. B64C 29/00
(52) U.S. Cl. ......................... 244/12.5; 244/23 D; 60/230
(58) Field of Search ............................... 244/73 R, 23 A, 244/12.4, 12.1, 12.5, 23 D; 60/230

(56) References Cited

U.S. PATENT DOCUMENTS

| | | | |
|---|---|---|---|
| 3,087,303 | * 4/1963 | Heinze et al. | 244/12.5 |
| 3,120,277 | 2/1964 | Brown et al. | 170/173 |
| 3,248,877 | * 5/1966 | Alderson et al. | 244/12.5 |
| 3,779,010 | 12/1973 | Chamay et al. | 60/226 A |
| 4,063,851 | 12/1977 | Weldon | 416/97 A |
| 4,463,903 | 8/1984 | Nightingale | 239/265.17 |
| 4,587,803 | 5/1986 | Nightingale et al. | 60/226.1 |
| 4,957,249 | * 9/1990 | Aulehla | 244/12.5 |
| 5,062,588 | * 11/1991 | Garland | 244/12.5 |
| 5,352,092 | 10/1994 | Ferleger et al. | 416/223 A |

OTHER PUBLICATIONS

Romine et al, "A Static Investigation of Several STOVL Exhaust System Concepts," AIAA Paper No. AIAA–89–2928, 7/89, 9 pages.

Rowe et al, "Static Internal Performance Evaluation of Several Thrust Reversing Concepts for 2D–CD Nozzles," AIAA Paper No. AIAA–84–1174, 6/84, 6 pages.

Banger et al, "Static Internal Performance of Nonaxisymmetric Vaned Thrust Reverser with Flow Splay Capability," NASA Technical Paper 2933, 9/89, p. 28.

Leavitt et al, "Static Internal Performance Characteristics of Two Thrust–Reverser Concepts for Axisymmetric Nozzles," NASA Technical Paper 2025, 6/82, p. 15.

* cited by examiner

Primary Examiner—J. Woodrow Eldred
(74) Attorney, Agent, or Firm—Andrew C. Hess; Rodney M. Young

(57) ABSTRACT

An exhaust nozzle includes cascade vanes mounted in a duct for discharging exhaust. The vanes have a dolphin profile which is effective for turning subsonically the exhaust near leading edges of the vanes, and then diffusing supersonically the exhaust downstream therefrom. Thrust efficiency of the vanes is therefore shifted to lower pressure ratios during operation for improving performance of the nozzle.

30 Claims, 3 Drawing Sheets

DOLPHIN CASCADE VANE

BACKGROUND OF THE INVENTION

The present invention relates generally to gas turbine engines, and, more specifically, to exhaust nozzles therefor.

A typical military fighter aircraft includes a turbofan gas turbine engine having an augmenter or afterburner for producing additional thrust when desired. The engine has high specific thrust and operates at a high pressure ratio during takeoff for providing exceptional acceleration.

Since the engine operates over varying output thrust, the exhaust nozzle therefor is typically variable in the form of a converging-diverging (CD) exhaust nozzle. The nozzle throat varies in flow area between maximum and minimum values for maximizing performance of the engine throughout its entire flight envelope. The high pressure ratio combustion gases exhausted from the engine may be choked at the throat at sonic velocity, and are subsonic in the converging nozzle and supersonic in the diverging nozzle.

The typical CD exhaust nozzle merely directs the exhaust in the axial downstream direction for propelling the aircraft forward in flight. Improvements in aircraft performance may be obtained by turning the exhaust in different directions. For example, a Short Takeoff and Landing (STOL) and Short Takeoff/Vertical Landing (STOVL) aircraft may use an auxiliary or secondary exhaust nozzle for redirecting some or all of the exhaust flow obliquely to the engine axial centerline axis and up to perpendicular or normal thereto.

The secondary exhaust nozzle must be integrated with the engine outlet duct in a compact and aerodynamically efficient package. The secondary exhaust duct should be as short as possible while maximizing turning efficiency of the exhaust as it is discharged axially from the engine and diverted radially outwardly.

In one example, the secondary nozzle includes two dimensional (2-D) cascade turning vanes located at the discharge end of the exhaust duct. These cascade vanes may have a simple, symmetrical teardrop profile between which the exhaust is turned and redirected from the aircraft. These cascade vanes may also have a simple crescent airfoil profile in the direction of flow turning.

These types of cascade vanes are also found in thrust reversers for temporarily turning engine exhaust for use in braking aircraft speed during landings. Efficiency of cascade-vane thrust reversers in a typical commercial aircraft is not a critical design objective since they merely provide auxiliary braking, and since the engines operate at low pressure ratios.

However, for a military STOL or STOVL aircraft, cascade vane design is critical to operation since the engines have high specific thrust and high pressure ratios during takeoff, and are sized by the required performance of the secondary exhaust nozzle. An inefficient secondary exhaust nozzle requires a larger engine which is heavier and more expensive, and reduces the overall performance of the aircraft. An efficient secondary exhaust nozzle permits corresponding reduction in size of the engine and improves the overall performance of the aircraft.

Accordingly, it is desired to provide an improved secondary exhaust nozzle having more efficient cascade vanes for improving performance of the aircraft.

BRIEF SUMMARY OF THE INVENTION

An exhaust nozzle includes cascade vanes mounted in a duct for discharging exhaust. The vanes have a dolphin profile which is effective for turning subsonically the exhaust near leading edges of the vanes, and then diffusing supersonically the exhaust downstream therefrom. Thrust efficiency of the vanes is therefore shifted to lower pressure ratios during operation for improving performance of the nozzle.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
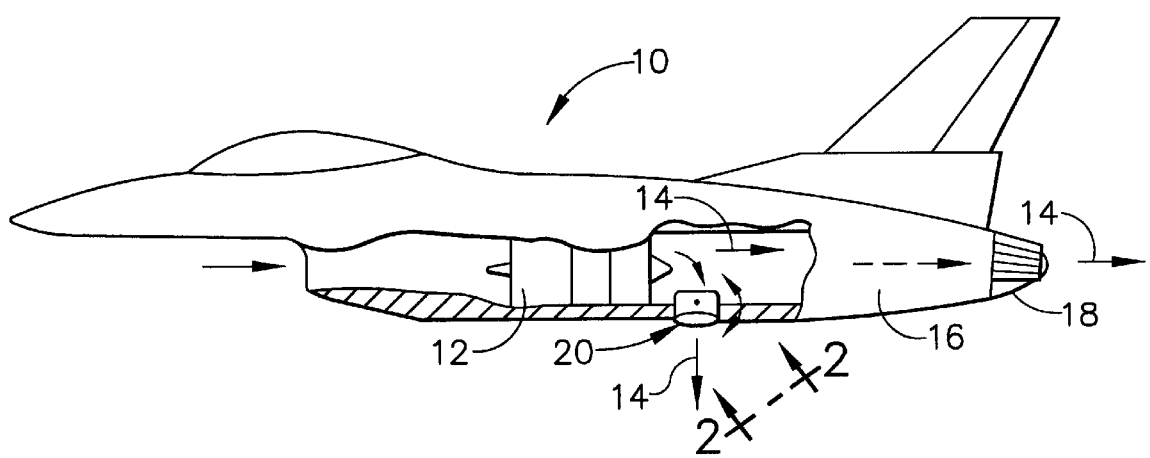
FIG. 1 is a partly sectional side view of an exemplary high performance military aircraft including a turbofan gas turbine engine with a main exhaust nozzle, and a secondary exhaust nozzle in accordance with an exemplary embodiment of the present invention.

Illustrated in FIG. 1 is a high performance, military fighter/attack aircraft 10 having one or more turbofan gas turbine engines 12 mounted therein. The engine may have any conventional configuration such as a low bypass, turbofan engine from which is discharged during operation exhaust gases 14 for producing propulsion thrust to power the aircraft in flight.

Disposed downstream from the engine inside the aircraft is a conventional augmenter or afterburner 16 which may be used to introduce additional fuel into the exhaust 14 for wet or reheat operation to provide additional thrust when desired. Disposed in turn downstream from the afterburner 16 is a variable area CD main exhaust nozzle 18 which directs the exhaust 14 in the axially aft or downstream direction for propelling the aircraft forward during takeoff and in flight.

For STOL and STOVL applications, the aircraft further includes a plurality of secondary exhaust nozzles 20 suitably disposed in flow communication with the engine 12 for selectively receiving at least a portion of the exhaust 14 for turning or redirection downwardly. As shown in more detail in FIG. 2, the secondary nozzle 20 includes a short flow duct 22 in the exemplary form of a tubular elbow for redirecting the exhaust 14 initially discharged axially from the engine in a lateral direction oblique to the centerline axis of the engine and typically downwardly.

Figure 2:
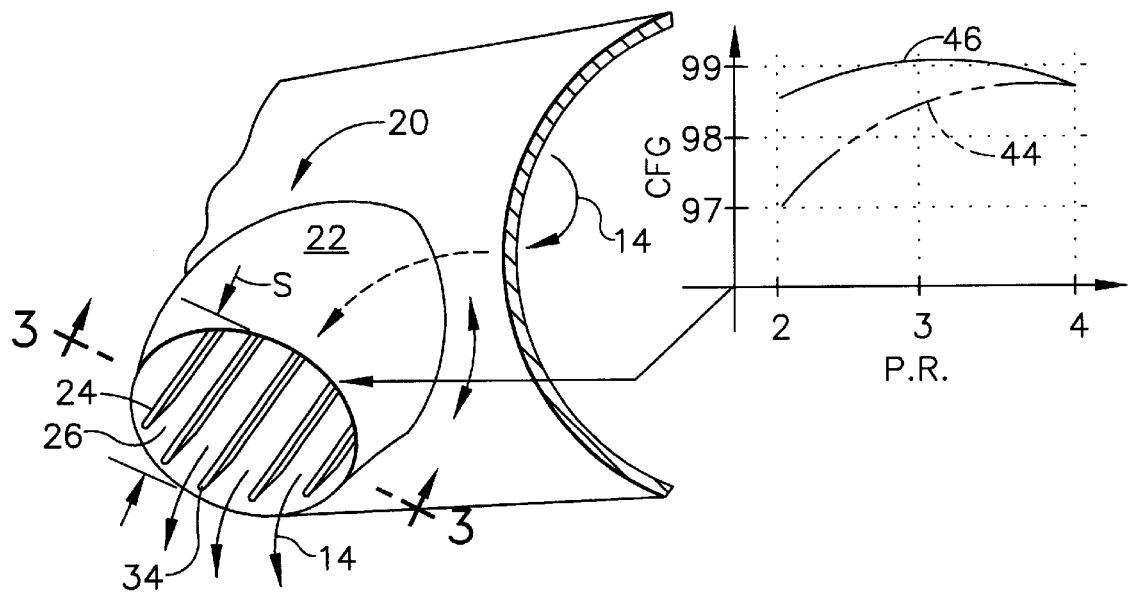
FIG. 2 is an isometric view of an exemplary embodiment of the secondary exhaust nozzle illustrated in FIG. 1 and taken along line 2—2, with a cooperating graph of thrust efficiency verses pressure ratio.

The exhaust duct 22 may be suitably pivoted to the engine or aircraft body as warranted for redirecting the exhaust over a range of angles including, for example, the axial downstream direction up to and including normal or perpendicular therefrom. For example, FIGS. 1 and 2 show the nozzle 20 directed downwardly for producing a downward thrust to raise the aircraft upwardly.

But for the present invention, the secondary exhaust nozzle 20 may have any conventional form for redirecting the exhaust 14 when desired in propelling the aircraft in flight. In accordance with the present invention, the secondary nozzle 20 includes a plurality of exhaust vanes 24, as initially shown in FIG. 2, which are laterally spaced apart from each other to define respective nozzle flow passages 26 at the distal or outlet end of the duct 22. The duct 22 itself may be an elbow up to about 90 degrees for initially turning the exhaust 14 in the desired direction. The cascade vanes 24 complete the required turning of the exhaust with enhanced efficiency for improving performance of the aircraft.

Figure 3:
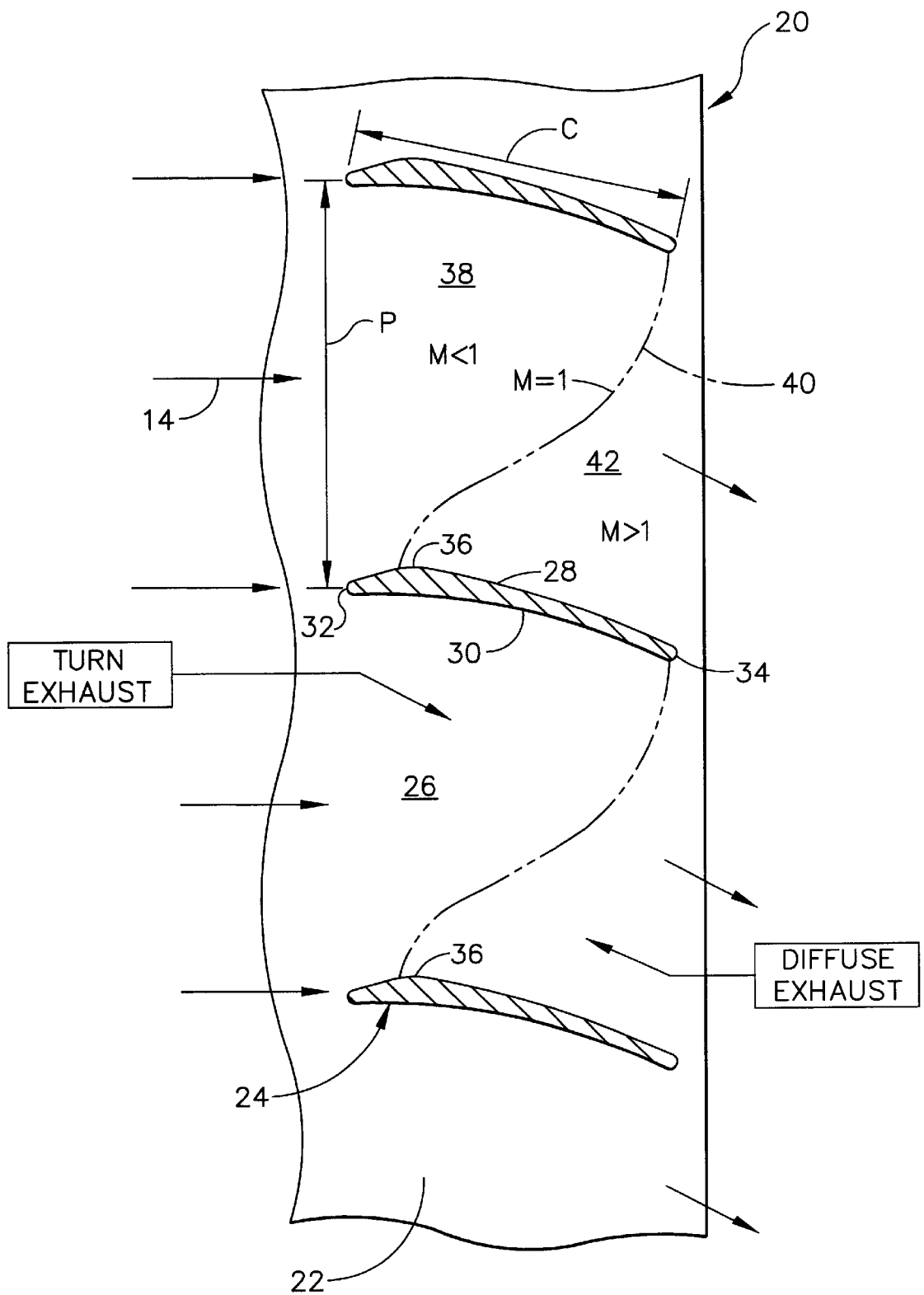
FIG. 3 is a sectional view through a portion of the exhaust nozzle illustrated in FIG. 2, and taken along line 3—3, showing an exemplary embodiment of dolphin exhaust vanes therein having an improved method of operation.

As better shown in FIG. 3, each of the vanes 24 includes a first or upper side or surface 28 and an opposite second or lower surface or side 30 extending axially between opposite leading and trailing edges 32, 34.

In accordance with the present invention, each of the vanes 24 has a precisely configured convex crown 36 spaced aft from the leading edge 32 along the upper side 28 to define a cascade exhaust vane having a generally dolphin profile or configuration.

The crown 36 is specifically configured so that each of the nozzle passages 26 includes a forward part or zone 38 extending axially or chordally from the vane leading edges 32 to an effective throat 40 which laterally bridges the trailing edge 34 of one vane and the crown 36 of an adjacent vane. Each nozzle passage 26 also includes an aft part or zone 42 extending aft from the throat 40 to the vane trailing edges 34, in particular along the vane upper sides 28.

The dolphin vanes 24 illustrated in FIG. 3 in cooperation with the nozzle passages 26 defined therebetween effect an improved method of turning the exhaust 14 through the secondary nozzle 20 for increasing thrust efficiency at lower pressure ratios across the vanes. Since the exhaust 14 is provided at a relatively high pressure ratio across the vanes, the exhaust is initially turned subsonically at a Mach number less than 1 near the vane leading edges 32 in the nozzle forward parts 38, and choked sonically at Mach 1 at the effective throat 40. The exhaust 14 is then diffused supersonically with a Mach No. greater than 1 in the passage aft parts 42 downstream from the throats 40.

By introducing the distinct crown 36 just aft of the vane leading edges 32, a majority of exhaust flow turning may be effected near the leading edges 32, while simultaneously reducing the area ratio of the nozzle passages 26 downstream therefrom to increase thrust efficiency at lower pressure ratios across the vanes.

Included in FIG. 2 is an associated performance graph which plots a thrust coefficient (CFG) versus pressure ratio (PR) across the vanes. Thrust efficiency of the secondary exhaust nozzle 20 may be evaluated from the plotted thrust coefficient and is indicative of the actual or realized thrust from the nozzle 20 compared to the maximum theoretical thrust therefrom.

The graph indicates that the nozzle thrust efficiency is a function of the system pressure ratio as measured across the cascade vanes 24. Analysis indicates that thrust efficiency increases to a peak value as pressure ratio increases. FIG. 2 includes a first curve 44 based on a typical subsonic cascade vane of generally crescent profile formed of primarily circular arcs. When such vanes are used in a high pressure ratio application subject to supersonic velocities, the peak thrust efficiency is found at undesirably large pressure ratios.

A typical system pressure ratio for the high specific thrust aircraft engine illustrated in FIG. 1 is greater than about 1.9 and results in supersonic exhaust flow. The secondary nozzle 22 is designed for a specific amount of flow turning such as about 22.5 degrees. The graph in FIG. 2 indicates that improved thrust efficiency may be obtained in the first curve 44 at high pressure ratios substantially greater than 2.0. However, the higher pressure ratios require a more complex, typically larger turbine engine with an attendant increase in weight and cost which are undesirable.

A critical objective, therefore, is to maximize thrust efficiency of the secondary nozzle 20 at relatively low pressure ratios for a given application. However, analysis indicates that simple, circular arc, crescent cascade vanes have limited usefulness in supersonic exhaust nozzles at relatively low pressure ratios.

For example, it is desired to size the engine illustrated in FIG. 1 for achieving a system pressure ratio of about 2.06, while simultaneously effecting about 22.5 degrees of flow turning in the secondary nozzle 20 with a desired thrust efficiency of about 98.5 percent. According to the graph in FIG. 2, these operating parameters are not possible with the simple cascade vanes representative of the first curve 44.

In accordance with the present invention, the improved dolphin vanes 24 exhibit the performance of the second curve 46 plotted generally in FIG. 2 having a substantial increase in thrust efficiency at the lower pressure ratios plotted.

Figure 4:
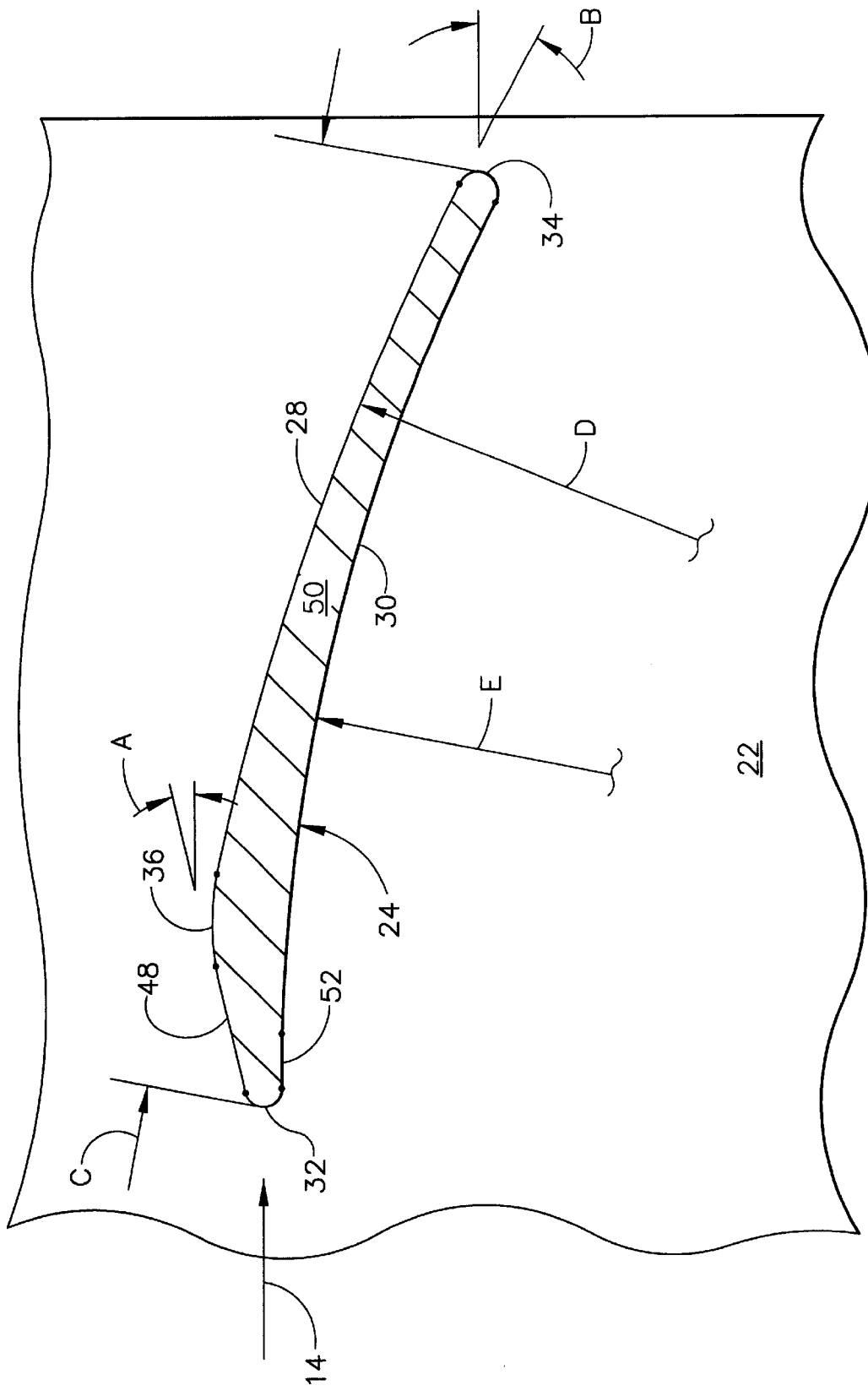
FIG. 4 is an enlarged cross sectional view of one of the exhaust vanes shown in FIG. 3 illustrating exemplary features thereof.

More specifically, FIG. 4 illustrates in more particularity an exemplary embodiment of the dolphin vane 24 mounted at the outlet end of the secondary nozzle duct 22. The crown 36 forms a convex portion of the vane upper side 28 spaced aft from the leading edge 32. The vane also includes a preferably flat or straight nose 48 which extends between the leading edge 32 and the crown 36. The nose 48 defines an incline or grade having an inclination angle A relative to the nominal or zero angle of attack of the approaching exhaust 14 at the leading edge 32.

Each vane 24 also includes an arcuate tail 50 extending chordally aft from the crown 36 to terminate at the trailing edge 34. The exhaust flow 14 initially engages each vane at its head, including the nose 48 and crown 36, and splits over the vane upper and lower sides 28, 30 for flow downstream along the relatively thin tail 50. The upper side 28 of the tail 50 at the trailing edge 34 has an inclination angle B which is opposite to the inclination angle A of the nose 48, and is in the same direction of the desired flow turning. In an exemplary embodiment, the nose 48 has an inclination angle A of about 15 degrees, and the tail 50 has an inclination angle B of about −26 degrees.

In the preferred embodiment illustrated in FIG. 4, the crown 36 is positioned well within the first half of the vane chord length C, and preferably at about 20 percent chord length from the leading edge 32. In this way, the straight nose 48 and adjoining convex crown 36 are positioned directly near the vane leading edges 32 for providing means to accomplish the majority of exhaust flow turning well forward in the nozzle passages 26 along the vane upper sides 28.

For example, for a total flow turning requirement of about 22.5 degrees across the entire cascade vane 24, a majority of that turning substantially greater than half thereof is effected subsonically in the nozzle passage forward part 38 as shown in FIG. 3. This contributes to higher overall efficiency of the secondary exhaust nozzle since flow turning is being effected at relatively low Mach numbers less than sonic.

Quite significantly, this configuration also permits tailoring of the vane tails 50 and the associated nozzle passage aft parts 42 to reduce the diverging area ratio and the associated CD nozzle effect. This biases the peak thrust efficiency closer to the lower design pressure ratio illustrated in the second curve 46 of FIG. 2.

For example, the dolphin vanes 24 and their associated nozzle passages 26 are effective for turning the exhaust about 22.5 degrees between the leading and trailing edges 32, 34 with a thrust efficiency of about 98.5 percent at a pressure ratio of about 2.06 across the vanes. This significant performance advantage provides a relatively high thrust efficiency for the secondary nozzle at relatively low pressure ratio for a given amount of flow turning in the nozzle. The high, 98.5 percent, thrust efficiency objective for the secondary exhaust nozzle 20 avoids the need for a larger, more complex, heavier, and expensive gas turbine engine which would otherwise be required for achieving the same thrust efficiency at the higher system pressure ratio using cascade vanes meeting the first curve 44 illustrated in FIG. 2.

Since a STOL or STOVL aircraft application requires engines sized for takeoff or landing conditions, the improved efficiency secondary exhaust nozzle 20 provides additional advantages. Any thrust lost in cascade exhaust vanes would otherwise be made up in higher engine airflows, which would result in larger and heavier engines, and correspondingly large aircraft engine bays. The high performance of the secondary exhaust nozzle 20 having the dolphin vanes 24 meets the desired high thrust efficiency requirement for minimizing engine size for a given application.

As indicated above, the cascade vanes in the secondary nozzle 20 illustrated in FIG. 3 not only turn the exhaust as it flows through the nozzle passages 26, but also diffuses the exhaust prior to discharge to the atmosphere. By positioning the vane crowns 36 near the vane leading edges, diffusion aft of the effective throats 40 and sonic line is substantially reduced or minimized.

Since the individual nozzle passages 26 vary in area between the leading and trailing edges of the adjacent vanes, and in view of the relatively high pressure ratios greater than about 1.9, the nozzle passages effect individual converging-diverging (CD) nozzles. The exhaust flow in the forward parts 38 is subsonic, and chokes at the effective throats 40, and then becomes supersonic in the aft parts 42 wherein diffusion occurs.

By locating the crown 36 in the head of each vane, the upper side 28 of each vane has a larger portion of the chord length from the crown to the trailing edge which correspondingly reduces the rate of diffusion in the nozzle aft parts 42. The efficient turning of the exhaust in the nozzle passage forward parts 38 and the correspondingly low diffusion in the aft parts 42 shift the peak thrust efficiency shown in the first curve 46 of FIG. 2 to correspondingly low values of the pressure ratio providing a substantial improvement over typical circular arc cascade vanes represented by the first curve 44.

Maximizing thrust efficiency of the secondary nozzle requires elimination or reduction in flow separation as the exhaust flows over the individual cascade vanes 24. A relatively thin, arcuate vane tail 50 illustrated in FIG. 4 ensures both a reduction in flow diffusion in the nozzle aft parts 42 while reducing or eliminating flow separation therealong.

In a preferred embodiment, the tail 50 has a single outer radius of curvature D between the crown 36 and the trailing edge 34 along the upper side 28. And, the tail 50 has a single inner radius of curvature E along the vane lower surface 30 from the trailing edge 34 preferably up to just short of the leading edge 32. The inner radius E is preferably less than the outer radius D and both are relatively large for providing a generally symmetrical and aft tapering tail 50.

In the exemplary embodiment illustrated in FIG. 4, both the leading and trailing edges 32, 34 are convex and have relatively small radii of about 1.0 mm, for example, and smoothly blend with the upper and lower sides 28, 30.

As indicated above, the leading edge 32 joins the upper side 28 at the flat or straight nose 48. Similarly, the leading edge 32 joins the lower side 30 at a flat or straight land or chin 52. The land 52 is shorter in chordal length than the nose 48 for more quickly blending with the single radius lower side 30. The longer nose 48 minimizes preturning of the exhaust 14 prior to reaching the crown 36 to provide efficient subsonic flow turning along the crown.

As shown in FIG. 2, each of the cascade vanes 24 has a span length S, and is preferably symmetrical therealong for two dimensional uniformity. The corresponding upper and lower sides 28, 30 illustrated in FIG. 3 have a substantially constant profile or section along the vane spans in the preferred embodiment. In this way, the nozzle passages 26 are constant in profile along the spans of the vanes for ensuring controlled subsonic turning of the exhaust flow followed in turn by supersonic diffusion thereof.

Solidity is a conventional term for vane-to-vane spacing or pitch. Solidity is defined as the ratio of chord length C illustrated in FIG. 3 divided by the pitch spacing P from vane-to-vane. A typical cascade vane solidity is greater than 1.0, and for the first curve 44 illustrated in FIG. 2 has a value of about 1.23.

Using the same solidity value of 1.23 for the dolphin vanes 24, as opposed to simple, circular arc cascade vanes, results in the secondary nozzle exceeding both the exemplary flow turning requirement of 22.5 degrees and the efficiency requirement of 98.5 percent at the design pressure ratio of 2.06. Accordingly, the solidity of the dolphin vanes 24 may be substantially reduced by about 35 percent, for example, for just satisfying the desired flow turning and thrust efficiency requirements.

For example, the solidity of the dolphin vanes 24 may be about 0.8 which permits a lower vane count or a fewer number of the dolphin vanes 24 to be used in the secondary nozzle 20. Since the elimination of one or more vanes from the flow duct 22 therefore provides flow area otherwise blocked by the vane, the duct 22 may be otherwise made smaller in size with the same total flow area for channeling the same amount of flow as compared to the higher solidity cascade vanes. The more compact secondary nozzle 20 may therefore be lighter for providing further improvements in the entire aircraft system.

The improved dolphin vanes disclosed above were additionally modeled at several angle-of-attack conditions to determine sensitivity of thrust coefficient and thrust vector angle thereto. Analysis indicates acceptable high performance of the dolphin vanes over positive and negative changes in angle of attack without significant flow separation which would adversely affect performance.

Additionally, on a flow per unit area basis, the dolphin vane secondary nozzle 20 channels a significantly higher percentage of exhaust flow due to its lower solidity. Either the additional flow may be used to advantage or the secondary nozzle may be reduced in size for a given flow requirement.

The improved secondary exhaust nozzle 20 disclosed above with the dolphin vanes 24 may be varied in configuration for different applications. By subsonically effecting a majority of flow turning near the vane leading edges, the rate of supersonic diffusion aft therefrom is reduced for effecting increased thrust efficiency of the nozzle at correspondingly lower pressure ratios for a given flow turning requirement. Accordingly, the dolphin head of the individual vanes, including the corresponding crowns 36, may be varied in each application for maximizing the increase in thrust efficiency at correspondingly lower pressure ratios. Although the pressure ratios used in the exemplary design effect supersonic flow in the nozzle passages 26, the dolphin vanes may be used to advantage in subsonic applications where warranted.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A dolphin exhaust vane comprising:
   an upper side and a concave lower side extending in chord between leading and trailing edges;
   a convex crown spaced aft from said leading edge along said upper side, and positioned within half said chord from said leading edge; and
   a flat nose extending between said leading edge and said crown.

2. A vane according to claim 1 further comprising an arcuate tail extending from said crown to said trailing edge.

3. A vane according to claim 2 wherein said tail has a single outer radius of curvature between said crown and trailing edge along said upper side, and a single inner radius of curvature along said lower side.

4. A vane according to claim 3 wherein said inner radius is less than said outer radius.

5. A vane according to claim 3 wherein said leading and trailing edges are convex.

6. A vane according to claim 3 wherein said leading edge joins said lower side at a flat land.

7. A vane according to claim 3 further comprising a span, and said upper and lower sides have a substantially constant profile therealong.

8. A vane according to claim 3 wherein said crown is positioned at about 20 percent chord length from said leading edge.

9. A cascade exhaust nozzle comprising:
   a duct having a plurality of vanes spaced apart to define respective nozzle passages for discharging exhaust;
   means for turning said exhaust subsonically near leading edges of said vane; and
   means for diffusing said turned exhaust supersonically downstream therefrom.

10. A nozzle according to claim 9 wherein a majority of said exhaust turning is effected near said vane leading edges to reduce area ratio of said passages downstream therefrom for increasing thrust efficiency at lower pressure ratio across said vanes.

11. A nozzle according to claim 10 wherein:
   each of said vanes includes upper and lower sides extending between leading and trailing edges, and a crown spaced aft of said leading edge along said upper side;
   each of said nozzle passages includes a forward part extending from said leading edges to an effective throat bridging a trailing edge and crown of adjacent vanes, and an aft part extending from said throat to said trailing edges; and
   said exhaust is turned subsonically in said forward part, choked sonically at said throat, and diffused supersonically in said aft part.

12. A nozzle according to claim 11 wherein said exhaust is turned about 22.5 degrees between said leading and trailing edges with a thrust efficiency of about 98.5 percent at a pressure ratio of about 2.06 across said vanes.

13. A nozzle according to claim 11 wherein crown is positioned at about 20 percent chord length from said leading edges.

14. A nozzle according to claim 11 wherein vanes have a solidity less than about 1.0.

15. A method of turning exhaust through a plurality of nozzle passages defined between corresponding cascade vanes comprising:
   turning said exhaust subsonically near leading edges of said vanes; and
   diffusing said turned exhaust supersonically downstream therefrom.

16. A method according to claim 15 further comprising effecting a majority of said exhaust turning subsonically near said leading edges to reduce area ratio of said passages downstream therefrom for increasing thrust efficiency at lower pressure ratio across said vanes.

17. A method according to claim 16 wherein:
   each of said vanes includes upper and lower sides extending between leading and trailing edges, and a crown spaced aft of said leading edge along said upper side;
   each of said nozzle passages includes a forward part extending from said leading edges to an effective throat bridging a trailing edge and crown of adjacent vanes, and an aft part extending from said throat to said trailing edges; and
   said exhaust is turned subsonically in said forward part, choked sonically at said throat, and diffused supersonically in said aft part.

18. A method according to claim 17 further comprising turning said exhaust about 22.5 degrees between said leading and trailing edges with a thrust efficiency of about 98.5 percent at a pressure ratio of about 2.06 across said vanes.

19. A method according to claim 17 wherein said crown is positioned at about 20 percent chord length from said leading edges.

20. An exhaust vane comprising upper and lower sides extending between leading and trailing edges, and means including a convex crown spaced aft from said leading edge along said upper side for turning exhaust subsonically near said leading edge and diffusing said turned exhaust supersonically downstream therefrom.

21. A vane according to claim 20 further comprising a flat nose extending between said ledge edge and crown.

22. A vane according to claim 21 further comprising an arcuate tail extending from said crown to said trailing edge.

23. A vane according to claim 22 wherein said tail has a single outer radius of curvature between said crown and trailing edge along said upper side, and a single inner radius of curvature along said lower side.

24. A vane according to claim 23 wherein said inner radius is less than said outer radius.

25. A vane according to claim 23 wherein said leading and trailing edges are convex.

26. A vane according to claim 23 wherein said leading edge joins said lower side at a flat land.

27. A vane according to claim 23 further comprising a span, and said upper and lower sides have a substantially constant profile therealong.

28. A vane according to claim 23 wherein said crown is positioned at about 20 percent chord length from said leading edge.

29. An exhaust vane for use in a cascade plurality thereof for turning exhaust in respective nozzle passages defined therebetween, comprising:

upper and lower sides extending between leading and trailing edges; and means including a convex crown spaced aft from said leading edge along said upper side for turning in said passages said exhaust subsonically near said leading edge, and diffusing said turned exhaust supersonically downstream therefrom.

30. A dolphin exhaust vane comprising upper and lower sides extending between leading and trailing edges, and means for turning exhaust subsonically near said leading edge and diffusing said turned exhaust supersoncially downstream therefrom.

* * * * *